US011973383B2

(12) United States Patent
Busse et al.

(10) Patent No.: US 11,973,383 B2
(45) Date of Patent: Apr. 30, 2024

(54) ROLLER MOLDING METHOD FOR PRODUCING A SPIRAL STRUCTURE

(71) Applicant: Fraunhofer-Gesellschaft zur Förderung der angewandten Forschung e.V., Munich (DE)

(72) Inventors: Matthias Busse, Bremen (DE); Franz-Josef Wöstmann, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 9 days.

(21) Appl. No.: 17/277,713

(22) PCT Filed: Sep. 19, 2019

(86) PCT No.: PCT/EP2019/075152
§ 371 (c)(1),
(2) Date: Mar. 18, 2021

(87) PCT Pub. No.: WO2020/058392
PCT Pub. Date: Mar. 26, 2020

(65) Prior Publication Data
US 2021/0351674 A1    Nov. 11, 2021

(30) Foreign Application Priority Data

Sep. 19, 2018   (DE) .................. 10 2018 215 975.0

(51) Int. Cl.
*H02K 15/04*   (2006.01)
*B22D 11/06*   (2006.01)

(52) U.S. Cl.
CPC ..... *H02K 15/0435* (2013.01); *B22D 11/0622* (2013.01)

(58) Field of Classification Search
CPC ...... H01F 41/04; H01F 41/061; H01F 41/063; H01F 41/064; H01F 41/066;
(Continued)

(56) References Cited

U.S. PATENT DOCUMENTS 1,690,887 A    11/1928   Davis
3,830,088 A *   8/1974   Couper .................. B21D 13/04
                                                    72/196
(Continued)

FOREIGN PATENT DOCUMENTS

DE   3515987 A1 *  11/1986   ............ G11B 15/26
DE   3515987 A1    11/1986
(Continued)

OTHER PUBLICATIONS

International Search Report and Written Opinion received for PCT Patent Application No. PCT/EP2019/075152, dated Dec. 11, 2019, 21 pages. (10 pages of English Translation and 11 pages of Original Document).

*Primary Examiner* — Peter Dungba Vo
*Assistant Examiner* — Joshua D Anderson
(74) *Attorney, Agent, or Firm* — Faegre Drinker Biddle & Reath LLP

(57) ABSTRACT

The present application creates a roller molding method for producing a spiral structure or a coil, in particular a spiral structure for use in electric machines, wherein material is supplied between a first roller and a second roller running opposite thereto, wherein the first roller has first teeth, and the second roller has second teeth, said first and/or second teeth having tooth flanks with cavities for receiving the supplied material, wherein the teeth are designed and aligned such that the cavity of at least one tooth is at least temporarily delimited by the surface of a tooth of the other roller when the rollers are rotating such that the supplied (Continued)

material is molded between the teeth into a portion of the spiral structure or the coil.

11 Claims, 7 Drawing Sheets

(58) Field of Classification Search
CPC .... H01F 41/068; H01F 41/071; H01F 41/074; H01F 41/077; H02K 15/04; H02K 15/0435; H02K 15/0442; H02K 15/045; H02K 15/0464; H02K 15/0471; H02K 15/0478; H02K 15/0485; H02K 15/0492; B21J 5/002; B21J 5/004; B21D 5/06; B21D 5/08; B21D 5/083; B21D 11/06; B21D 11/07; B21D 13/04; B21D 13/045; B21D 13/08; B21F 1/04; Y10T 29/10; Y10T 29/49071; B29C 59/04; B29C 59/043; B29C 59/046
See application file for complete search history.

(56) References Cited

U.S. PATENT DOCUMENTS

| | | | |
|---|---|---|---|
| 3,844,336 A | 10/1974 | Aluminum | |
| 4,170,122 A * | 10/1979 | Cowell | B21D 13/04 428/596 |
| 4,499,040 A | 2/1985 | Maemoto et al. | |
| 4,614,632 A * | 9/1986 | Kezuka | B29C 51/22 425/363 |
| 5,176,020 A * | 1/1993 | Maruo | B21D 53/025 72/186 |
| 5,679,106 A * | 10/1997 | Ohno | F28F 1/325 492/30 |
| 6,662,615 B2 * | 12/2003 | Hunt | B21D 13/04 29/890.047 |
| 2002/0170696 A1 | 11/2002 | Akers et al. | |
| 2005/0274012 A1 * | 12/2005 | Hodgson | F01N 3/2821 29/773 |
| 2016/0271664 A1 * | 9/2016 | Huang | B21D 13/04 |
| 2018/0152086 A1 * | 5/2018 | Götz | H02K 3/30 |
| 2021/0354193 A1 | 11/2021 | Wstmann et al. | |

FOREIGN PATENT DOCUMENTS

| | | |
|---|---|---|
| DE | 102016202657 A1 | 8/2017 |
| EP | 2387135 A2 | 11/2011 |
| EP | 2819276 A2 | 12/2014 |
| GB | 0706390 A | 3/1954 |
| JP | 58-126112 A | 7/1983 |
| JP | 2000-167709 A | 6/2000 |
| JP | 2004-525774 A | 8/2004 |
| JP | 2004-243324 A | 9/2004 |
| JP | 2004-336969 A | 11/2004 |
| JP | 2015-002614 A | 1/2015 |
| JP | 2017-005847 A | 1/2017 |
| JP | 2022-512553 A | 2/2022 |

* cited by examiner

ROLLER MOLDING METHOD FOR PRODUCING A SPIRAL STRUCTURE

CROSS REFERENCE TO RELATED APPLICATIONS

The present application is a national stage application of International Application No. PCT/EP2019/075152, filed Sep. 19, 2019, which claims priority to German Application No. DE102018215975.0, filed Sep. 19, 2018, the disclosures of which are hereby incorporated by reference in their entireties.

FIELD OF THE DISCLOSURE

The preset application relates to a "roller molding method" for producing a spiral structure.

BACKGROUND OF THE DISCLOSURE

Wound coils are used in electric machines. The coils do not ideally fill the available installation space. This results in a lower power or torque density of the electric machines in relation to the weight or the installation space. A better filling degree is achieved by the use of cast, formed or printed coils of variable cross-section, and the above-mentioned disadvantages are improved. The geometric shaping of such coils, however, is challenging from a manufacturing viewpoint.

The shaping of these coils is difficult on account of the complex three-dimensional geometry, and, until now, was performed primarily in permanent molds or lost molds with or without cores. These are generally discontinuous methods which are technically complex with regard to the tools in which the coils are produced.

SUMMARY

With this invention, the coils are shaped between two continuously rotating rollers, optionally with a controllable angular speed profile of the rollers.

Tooth-like geometries are provided over the circumference of the rollers, and cavities are formed in their flanks and constitute the hollow space that has a shaping effect as the tooth flanks are moved in a rolling motion. As a result of the rotational movement of the rollers and the rolling movement of the tooth flanks, the mold cavity closes and opens depending on the rotary angle.

Each flank pair of the rollers is assigned a modified geometry of the cavity, in which the width and depth of the cavity each change so that the first cavity geometry engages in the material again after a complete revolution of both rollers. A change in cross-section is thus possible for the resultant coil for each winding limb. Furthermore, rounded edges and U-shaped or other cross-sectional shapes are possible for the winding limbs (also circumferentially), for example so as to be able to conduct a cooling medium through the coil.

The advantage of the invention lies in the reduction of the manufacturing outlay, and therefore an economical alternative, suitable for series manufacture, to previously known shaping methods for electrical coils of variable cross-section is provided.

A further advantage is that the coil geometry may be produced in a continuous process and afterwards merely has to be separated from the following coil. Throughput and productivity may thus be significantly increased.

There is no need for any cores, nor is there any twisting of the coil during the shaping process, which otherwise would have to be reversed after demolding. The coils produced continuously by roller molding merely have to be upset afterwards in the z direction. The degrees of forming in this regard are much smaller than those required to reverse the twisting of the coils in other shaping methods.

A further advantage of roller molding is the optional integration of the coating in the method sequence.

The claims relate, amongst other things, to a roller molding method for producing a spiral structure or a coil, in particular a spiral structure for use in electric machines, wherein material is supplied between a first roller and a second roller running opposite thereto, wherein the first roller has first teeth, and the second roller has second teeth, and the first and/or second teeth have tooth flanks with cavities for receiving the supplied material, wherein the teeth are designed and aligned such that the cavity of at least one tooth is at least temporarily delimited by the surface of a tooth of the other roller when the rollers are rotating such that the supplied material is molded between the teeth into a portion of the spiral structure or the coil, and also to a corresponding roller molding device.

The term "roller molding" is a new term and refers to the shaping of structures by the rolling motion of toothed-wheel-like elements provided with cavities.

The term "portion of the spiral structure or a coil" is understood to mean a portion shaped in the roller molding process. For example, it may be a "gradient portion". This is understood to mean at least a portion of the spiral structure that has a twist and/or a height offset in the direction of the central axis of the resultant spiral structure or the later coil. In the case of a rectangular spiral structure according to FIG. 1 and FIGS. 2a-2d (see below), this may be the height offset of a winding limb producible by the tooth arrangement shown in FIG. 4 (see below).

Further details in this regard are presented in the dependent claims and in the rest of the description of this patent application.

BRIEF DESCRIPTION OF THE DRAWINGS

Embodiments are disclosed in the accompanying drawings.

In the drawings.

DETAILED DESCRIPTION OF THE DRAWINGS

Figure 1:
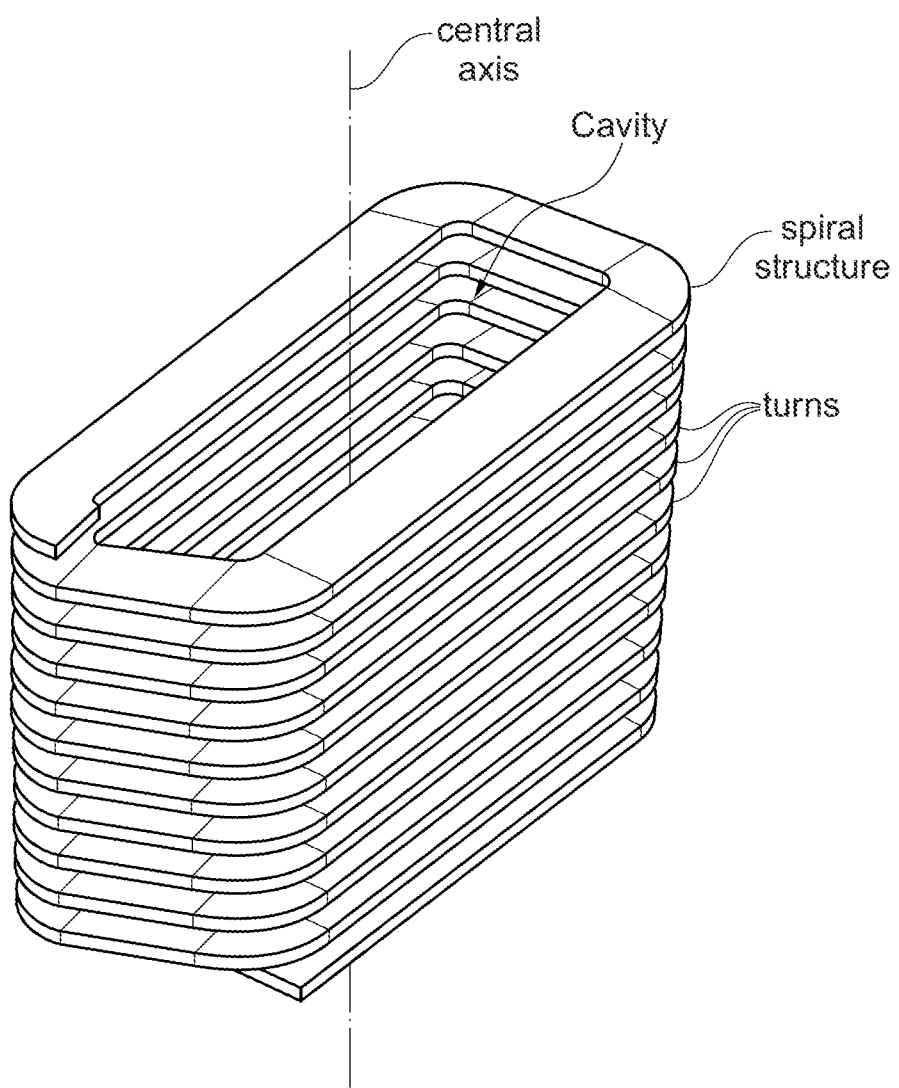
FIG. 1 shows a typical coil geometry.
Figure 2A:
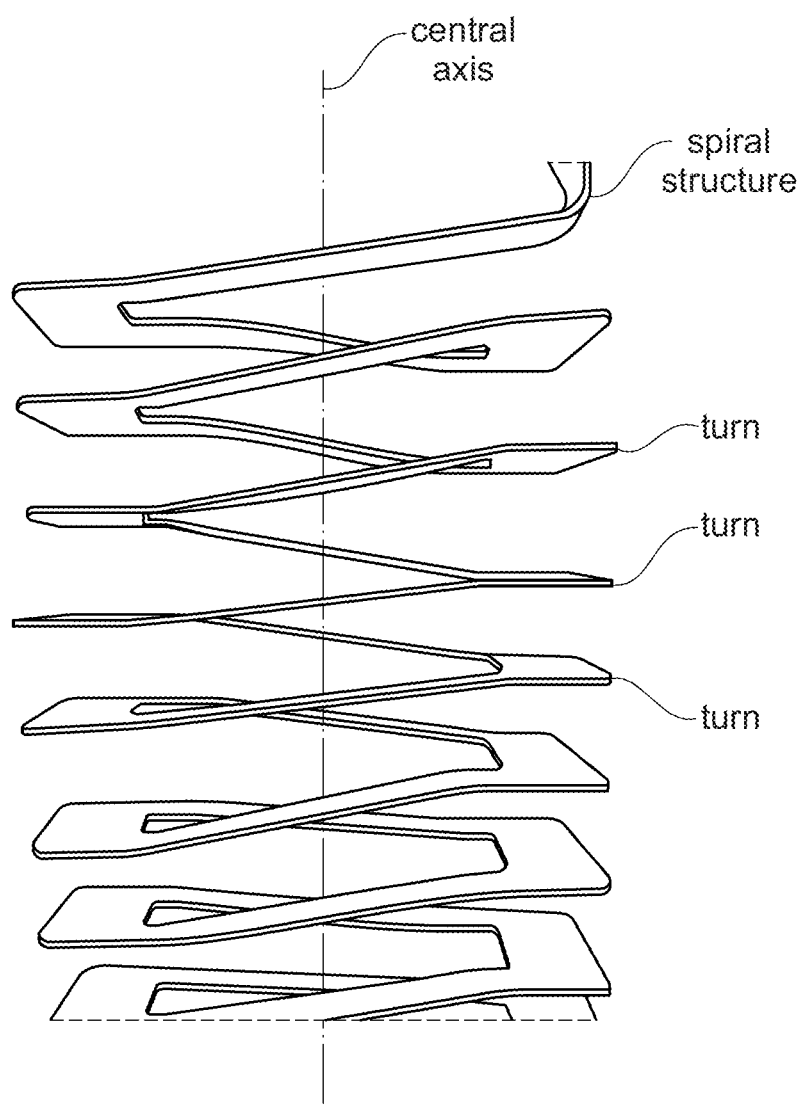
FIGS. 2a, 2b, 2c, and 2d show details of a geometry of a spiral structure as the result of the roll molding process.
Figure 2B:
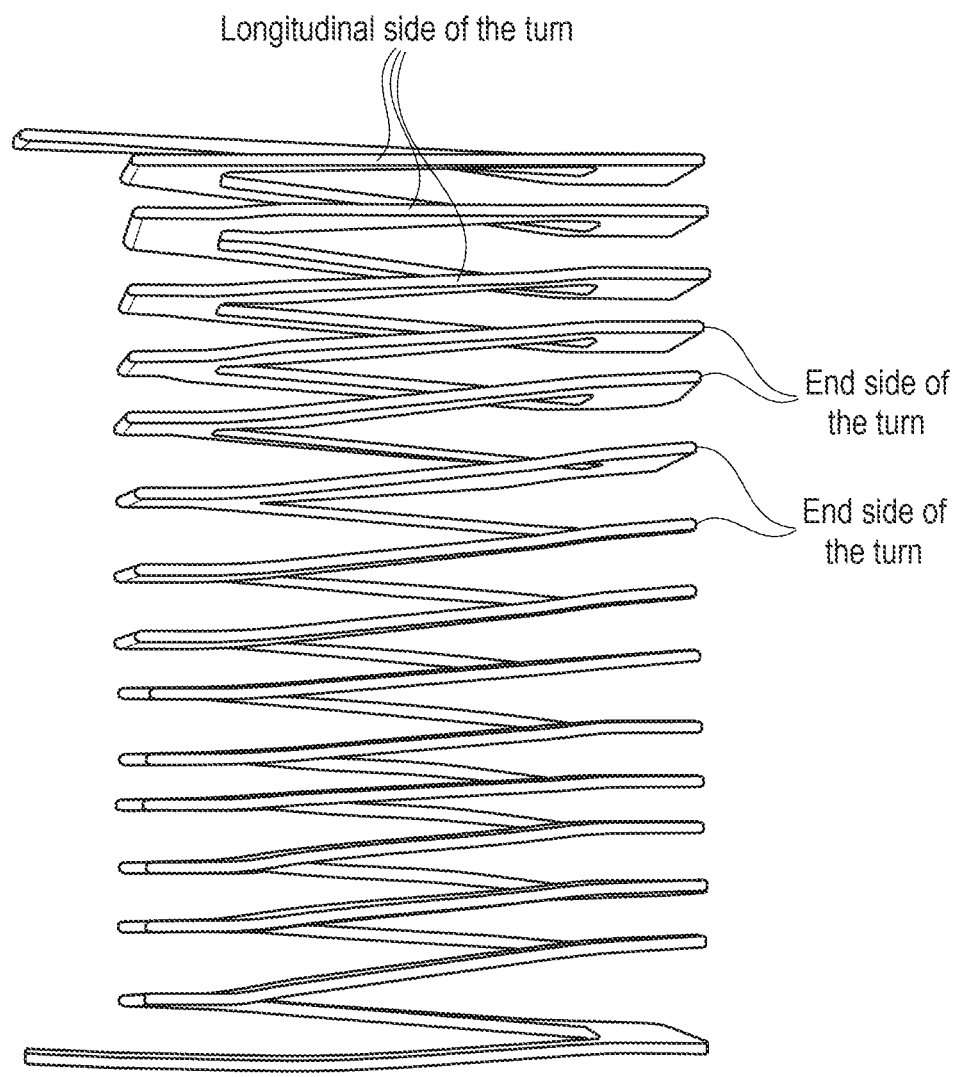
Figure 2C:
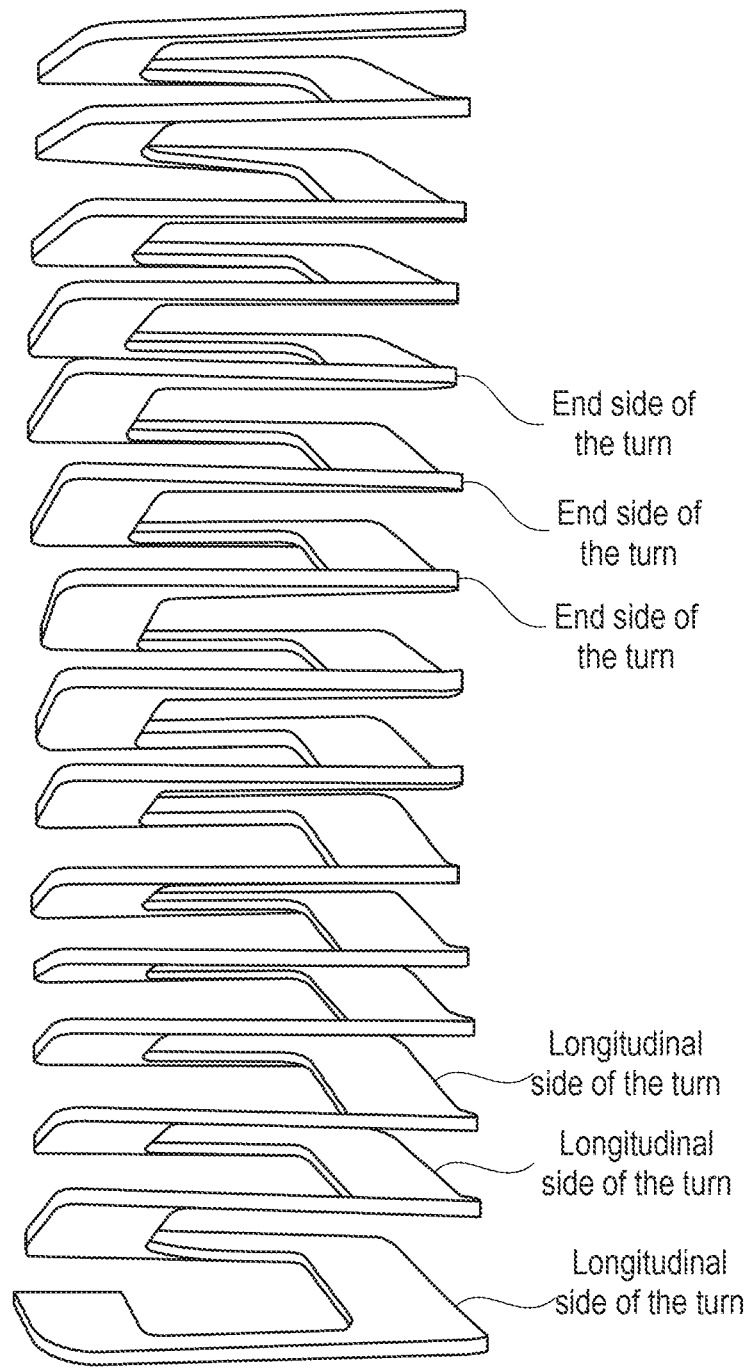
Figure 2D:
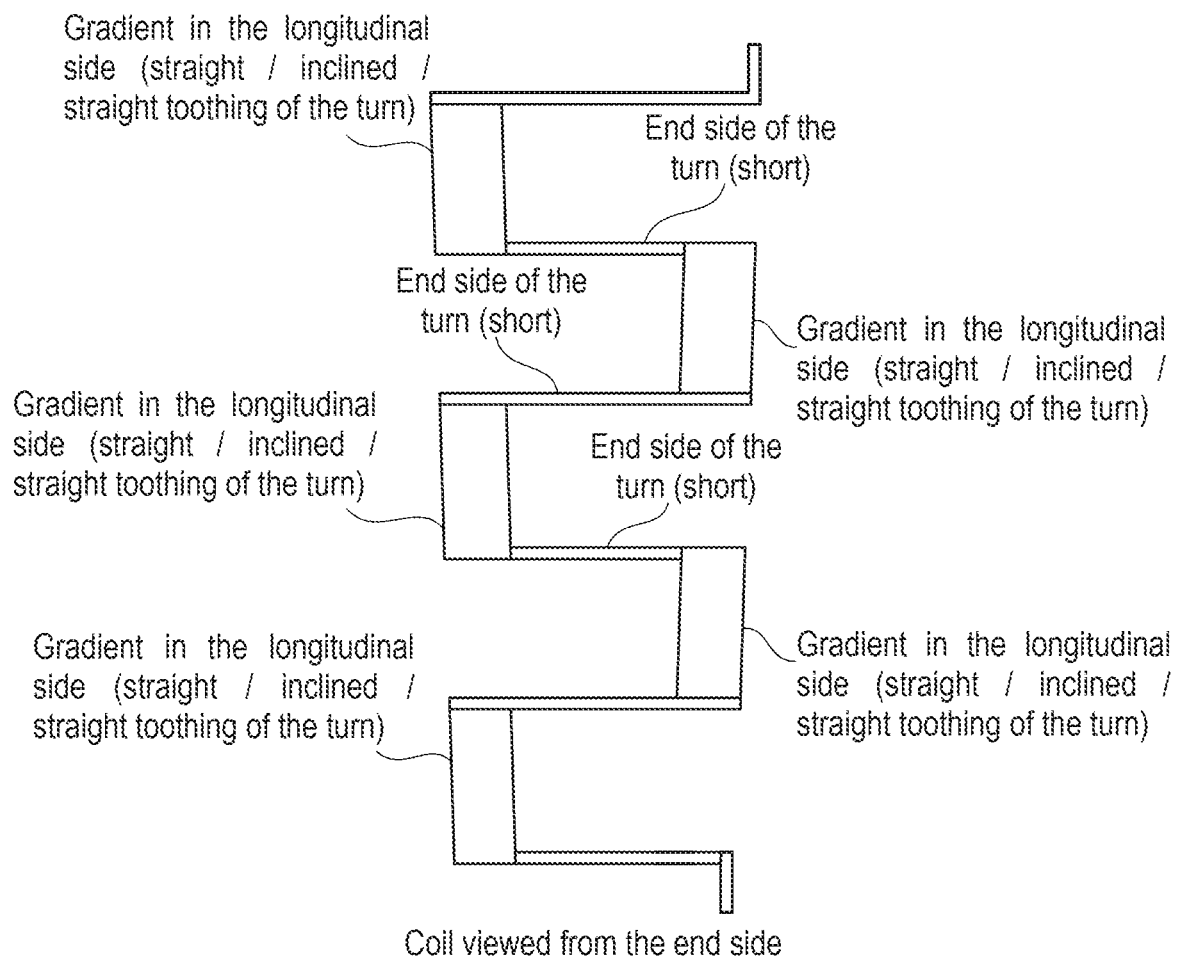

A typical geometry of the coil is shown in FIG. 1. This coil is described in detail in EP 2 387 135 A2.

In order to produce this geometry, in accordance with the present patent application, a geometry that is pulled apart ("stretched") in the z height direction is firstly produced and is then reshaped by subsequent upsetting in the z direction to give the geometry shown in FIG. 1. Therein, there is no twisting along the individual winding limbs. The resultant deformation region for the subsequent upsetting to give the end geometry lies in the transition region from the narrow to the long winding limbs. The subsequent upsetting process merely requires very small degrees of deformation.

FIGS. 2a-2d show a typical geometry illustrating the "stretched" coil produced in the roller molding process.

Figure 3:
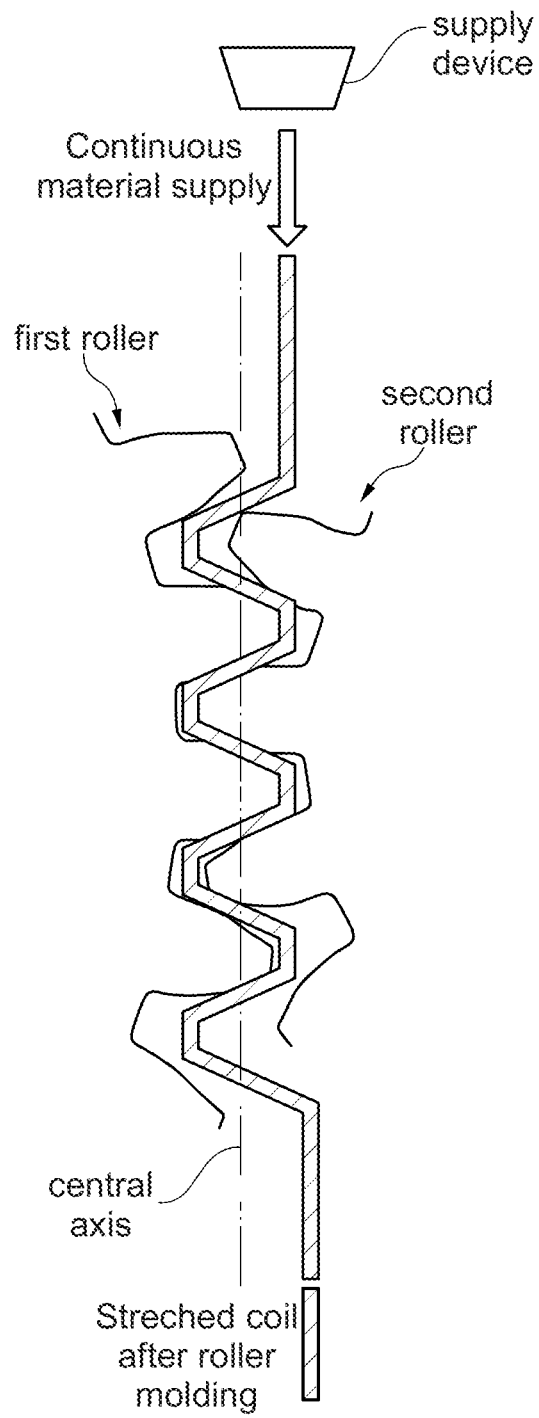
FIG. 3 shows the principle of the roller molding process.
Figure 4:
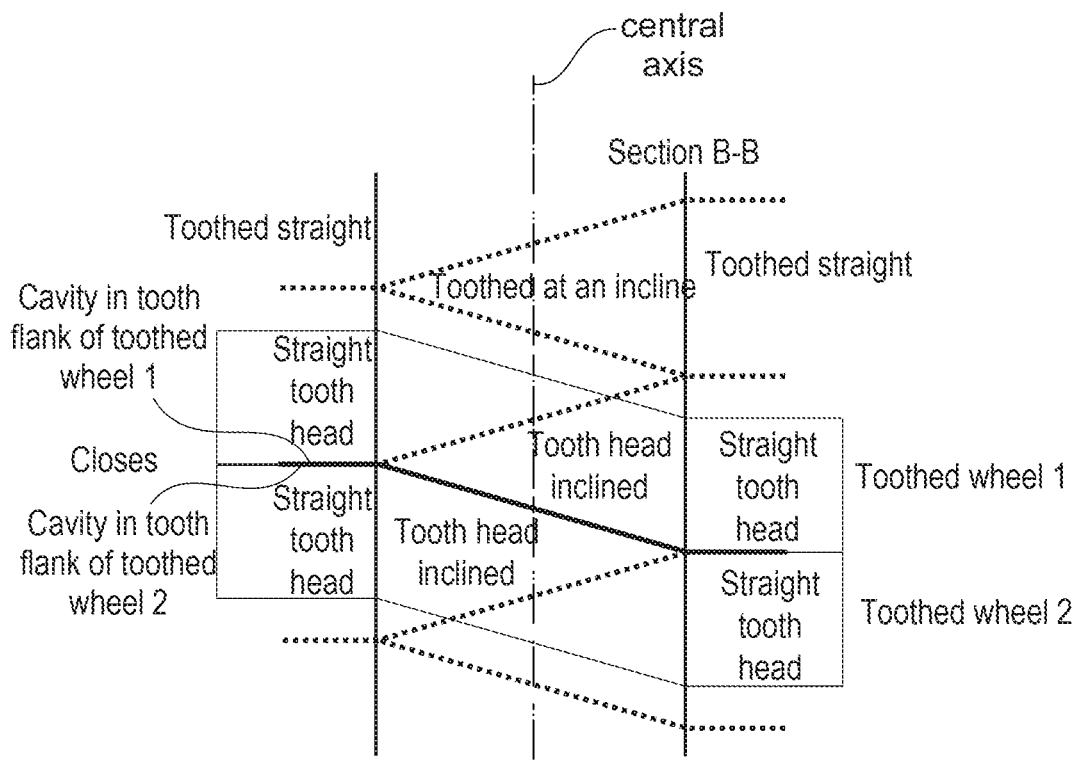
FIG. 4 shows the "straight toothing-inclined toothing-straight toothing" combination.
Figure 5:
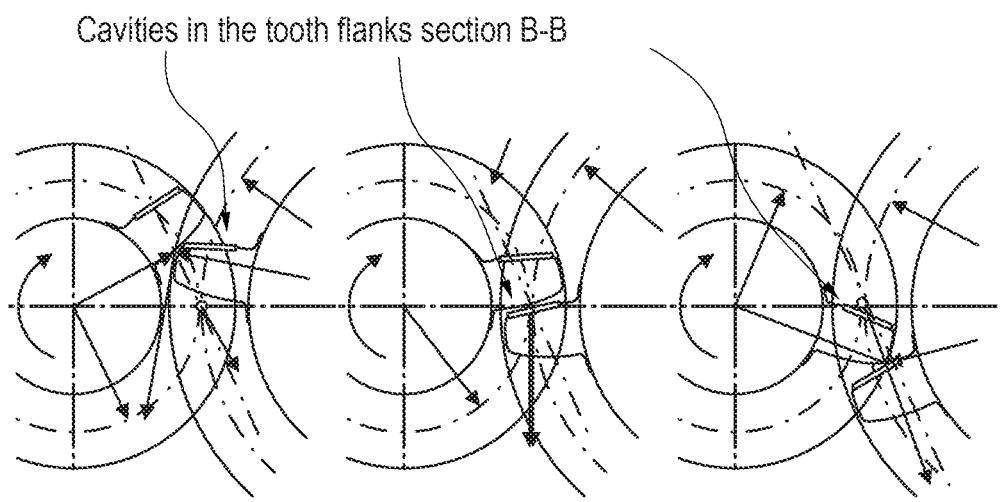
FIG. 5 shows opening and closing cavities in the roller molding process.

The principle of the roller molding process is shown in FIG. 3. In particular, the following features are applicable for the roller molding process:

a) The two rollers having toothed-wheel-like geometries rotate oppositely to one another. They close and open the cavities for the coil winding due to the rolling movement of the tooth flanks. The cavities are formed in the various tooth flanks and may be different from tooth to tooth so as to allow variable cross-sections of the resultant turns, through which a flow may pass as necessary.

b) A typical geometry shown in FIGS. 2a-2d results, for example due to a toothing combination on each roller consisting in each case of:

"straight toothing—inclined toothing—straight toothing", similarly to a herringbone toothing, in which the two inclined toothings are combined. FIG. 4 explains such a toothing arrangement on roller 1 (toothed wheel 1) and roller 2 (toothed wheel 2).

A particular advantage of roller molding is that the produced coil geometry does not contain any twisting, and after the shaping of the coil there is merely the need for an upsetting process in the z direction. There is no need for any twisting about the longitudinal axis of the turns in the case of the roller molding process.

c) Following a complete revolution of the two rollers, a coil of varying cross-section of the turns in a stretched geometry is produced. The coil may be separated after one revolution and then processed further. Since the process may be performed continuously, the coils may also be separated at a later moment in time of the manufacturing chain.

d) The shaping cavity is both closed and opened due to the kinematics of the tooth flanks (for example in the toothing combination shown in FIG. 4). Once the coil has left the rolling region, the coil geometry of varying cross-section of the turns is demolded.

e) As the material is supplied to the roller molding process, the supply device may traverse the coil geometry in the x-y direction (for example in a cyclical rectangular movement) and may thus assist the supply process in a manner coordinated with the roller movements. In this case, a movement of the supply device that lies vertically above the cavity opening into the rolling tooth flanks is expedient. This path generally corresponds to the coil geometry when viewed from above (for example a rectangular path). Furthermore, the supply device may assist this vertical position by appropriate (peripheral) tilting, so that the supplied material may enter at a flat angle (similarly to the way a paintbrush is guided when painting), thus simplifying and optimizing the filling of the cavity.

This may be implemented for example by robot-guided supply devices or other movement devices that can be coordinated selectively. The movement of the supply device must be coordinated with the rotation of the rollers. The roller movement may be continuous/uniform here or may be adjusted with an optimized speed profile to the conditions of the material supply or the solidification process.

f) The material may be supplied in principle in liquid, thixotropic or solid phase or also in all intermediate phases. These possibilities are described in greater detail in supplementary invention disclosures or patent applications of the inventors.

g) In principle, all electrically conductive materials are suitable as materials for the coil, in particular aluminum, copper and their respective alloys, all metallic materials, but also hybrid materials such as electrically conductive plastic composites.

h) If the material is supplied not in liquid form (see parallel patent application in the name of the same applicant), a heating of the material may facilitate and support the supply to the roller molding process. Therefore, both the material supply and the process of the shaping of the particular turn portion may be significantly facilitated or optimized in the supply device by heating the material as necessary, for example to just below the solidus temperature or by selectively adjusting the thixotropic material state.

i) The supplied material may be heated for example in the supply device. All known heating methods are possible for this purpose. In particular when heating and adjusting the thixotropic material state, inductive heating of the material is possible, amongst other things. In this case, the material is heated continuously during the supply process so as to allow the material to be introduced in controlled fashion into the mold cavities.

j) Alternatively to the heating of the material in the supply device, the material may be heated by applying an electrical voltage. In this case, the voltage is applied between the supply device and the tooth flanks (with the cavities). By appropriately controlling current/voltage, the supplied material may thus be heated selectively directly over the path from the supply device until inside the mold cavities.

k) The tooth flanks with the mold cavities may optionally also be temperature-controlled. On the one hand, this may be a controlled heating of the mold cavities in the tooth flanks. The shaping process may thus be supported after the material has been supplied. On the other hand, a controlled cooling of the tooth flanks may also be provided, for example so as to influence the solidification in the mold cavity as the liquid material (casting) or thixotropic material is supplied. Due to accelerated cooling, improved joining properties may be achieved on the one hand, and on the other hand the productivity of the roller molding may be increased because with a larger material throughput (quicker speed of rotation of the rollers) the solidification or cooling and stabilization of the produced coil may be achieved.

l) By spraying a suitable release agent onto the rotating rollers in the region of the shaping cavity, the demolding of the stretched coil as it exits from the rolling region may be simplified, on the one hand. On the other hand, the release agent may have, for example, an oxidizing effect on the surface of the coil turns, which intensifies the electrical insulation of the turns from one another (anodizing effect) and at the same time may have a supporting effect for the subsequent coating for insulation of the coil.

m) A coating may be applied in order to electrically insulate the coil. This coating may be performed on the one hand by a downstream roller pair with comparable tooth flank geometry, into which the stretched coil is drawn once more. The insulation material is first introduced continuously into the cavities in this second roller pair, such that, as the stretched coil passes through, the insulation material is applied to the turns, possibly at elevated temperature, similarly to a roll cladding process.

n) Alternatively to the coating in a second roller pair (see above bullet m), the insulation material may also be applied in the same roller pair in which the actual shaping is also performed. To this end, before the electrically conductive coil material is introduced, the insulation layer is introduced into the mold cavities, for example as described under bullet m).

o) Alternatively to bullet m), the coating may also be provided by not demolding the coil from the shaping cavities following the shaping process, but instead winding it axially onto one of the two rollers. Following one or more revolutions, the coil geometry thus arrives again axially in the engagement region due to the winding on one of the two rollers and may be coated there as described under bullet m). Only then is the already coated coil then demolded in this option by being unwound from the roller.

p) The techniques for coating are further differentiated and described in greater detail in supplementary invention disclosures. These methods are alternatives to known coating processes for which patents have already been filed.

The invention claimed is:

1. A roller molding method for producing at least one of a spiral structure and a coil, the at least one of the spiral structure and the coil having at least one turn that winds around a cavity and around a central axis of the one of the spiral structure and the coil, the central axis extending along the cavity, wherein each of the at least one turn comprises a first leg, a second leg, a third leg, and a fourth leg together surrounding the central axis, the roller molding method comprising:

supplying material between a first roller and a second roller running opposite to the first roller, wherein the first and second rollers rotate one of continuously and at varying speed, wherein the first roller has first teeth, the second roller has second teeth, and at least one of the first teeth and the second teeth have tooth flanks with cavities for receiving the supplied material, wherein the first teeth and the second teeth are aligned such that a cavity of at least a first tooth of one of the first teeth and the second teeth is at least temporarily delimited by a surface of a second tooth of the other of the first teeth and the second teeth when the first and second rollers are rotating such that the supplied material is molded between the first teeth and the second teeth into the at least one turn surrounding the central axis, comprising the first leg, the second leg, the third leg, and the fourth leg of the at least one of the spiral structure and the coil, each of the at least one turn comprising a gradient portion of the one of the spiral structure and the coil, the gradient portion having a height offset in a direction along the central axis of the one of the spiral structure and the coil, wherein the first teeth and the second teeth include, in portions, a straight toothing and an inclined toothing, in a sequence of straight toothing/inclined toothing/straight toothing, wherein the gradient portion of the one of the spiral structure and the coil is produced by the inclined toothing.

2. The roller molding method according to claim 1, wherein the supplied material is one of liquid, thixotropic and solid.

3. The roller molding method according to claim 1, wherein the supplied material at least one of (1) is a flat material with one of a round and rectangular cross-section and (2) has a meandering structure if the supplied material is not in a liquid state.

4. The roller molding method according to claim 1, wherein the supplied material comprises at least one of a metal and a plastic.

5. The roller molding method according to claim 4, wherein the metal comprises at least one of iron, aluminum, copper, and alloys thereof.

6. The roller molding method according to claim 1, further comprising heating the material before supplying the material between the first roller and the second roller.

7. The roller molding method according to claim 6, wherein heating the material comprises at least one of applying current and voltage between the first and second rollers and a supply device and inductively heating the material.

8. A roller molding device for producing at least one of a spiral structure and a coil, the at least one of the spiral structure and the coil having at least one turn that winds around a cavity, and around a central axis of the one of the spiral structure and the coil, the central axis extending along the cavity, wherein each of the at least one turn comprises a first leg, a second leg, a third leg, and a fourth leg together surrounding the central axis, the roller molding device comprising:

at least a first roller with first teeth and a second roller, running opposite to the first roller, with second teeth, wherein at least one of the first teeth and second teeth have tooth flanks with cavities for receiving supplied material, wherein the first teeth and second teeth are aligned such that a cavity of at least a first tooth of one of the first teeth and the second teeth is at least temporarily delimited by the surface of a second tooth of the other of the first teeth and the second teeth when the first and second rollers are rotating in order to mold the supplied material between the teeth into the at least one turn surrounding the central axis, comprising the first leg, the second leg, the third leg, and the fourth leg of the one of the spiral structure and the coil, wherein the first teeth and the second teeth include, in portions, a straight toothing and an inclined toothing, in a sequence of straight toothing/inclined toothing/straight toothing, for producing a gradient portion in each turn of the one of the spiral structure and the coil, the gradient portion having a height offset in a direction along the central axis of the one of the spiral structure and the coil, wherein the gradient portion of the one of the spiral structure and the coil is produced by the inclined toothing.

9. The roller molding device according to claim 8, further comprising a supply device for aligning the supplied material provided to the first and second rollers.

10. The roller molding device according to claim 9, wherein the supply device is configured for inclining and rotating flat material relative to the first and second rollers.

11. The plurality of spirals according to claim 8, wherein the spiral structure includes rectangular spirals.

* * * * *